UNITED STATES PATENT OFFICE.

ANDREW CYRUS McLAUGHLIN, OF AUSTIN, TEXAS.

PROCESS OF MAKING AMMONIUM ICHTHYOL SULFONATE.

SPECIFICATION forming part of Letters Patent No. 681,568, dated August 27, 1901.

Application filed April 21, 1900. Serial No. 13,766. (No specimens.)

*To all whom it may concern:*

Be it known that I, ANDREW CYRUS MCLAUGHLIN, a citizen of the United States, residing at Austin, in the county of Travis and State of Texas, have invented certain new and useful Improvements in the Production of a Compound Ichthyol Sulfonate or Sulfoichthyolate of Ammonia, of which the following is a specification.

My invention or discovery is an improvement in the process of making ichthyol sulfonate.

It consists, generally speaking, of four distinct steps, which include, first, distillation of asphaltum; second, treatment with acid; third, precipitation, and, fourth, purification.

The first step consists in distilling asphaltums containing sulfur in a suitable retort and collecting the liquid sulfo-hydrocarbons in suitable receivers. Second, certain of the sulfo-hydrocarbons obtained, as above pointed out, are agitated with strong sulfuric acid until the reaction between the two substances is complete. In this reaction certain sulfonic acids are formed. After the reaction the liquid separates with a heavy dark-colored portion, which contains the sulfonic acids and a light-colored portion. Third, the heavier dark-colored portion of the reaction mixture, resulting from the second step, is neutralized by means of ammonium carbonate or its substitutes. As a result of the neutralization a black impure ichthyol sulfonate of ammonia separates out. Fourth, the ichthyol sulfonate resulting from the third step as above is thoroughly washed in petrolic ether. The washed product is now treated with methyl alcohol and filtered. The methyl-alcohol solution of ichthyol sulfonate of ammonia is evaporated and the ichthyol sulfonate is recovered.

Having thus described the manner of producing the product, what I claim as new, and desire to secure by Letters Patent, is—

The herein-described process of making ichthyol sulfonate of ammonium, which consists in distilling asphaltum, collecting the liquid hydrocarbon in suitable receivers, agitating with strong sulfuric acid the sulfohydrocarbons, until the reaction between the two substances is complete; after which reaction the liquid divides itself into a heavy dark-colored portion containing certain sulfonic acids and a lighter-colored portion; the heavy dark-colored portion of the reaction mixture resulting from the second step is neutralized by means of ammonium carbonate; as a result of this neutralization, a black impure ichthyol sulfonate of ammonium separates out, is thoroughly washed with petrolic ether and the washed product is now treated with methyl alcohol and filtered, the methyl-alcohol solution is evaporated and the dissolved ichthyol sulfonate of ammonium is recovered.

In testimony whereof I affix my signature in presence of two witnesses.

ANDREW CYRUS McLAUGHLIN.

Witnesses:
    J. BOULDIR RECTOR,
    PAUL E. SWANCOAT.